March 13, 1928.

E. HOWE

ELECTRIC SUPERHEATER

Filed Feb. 17, 1927

INVENTOR.
Emil Howe,
BY L. N. Gillis
ATTORNEY.

March 13, 1928.                    E. HOWE                    1,662,746
                            ELECTRIC SUPERHEATER
                           Filed Feb. 17, 1927          2 Sheets-Sheet 2
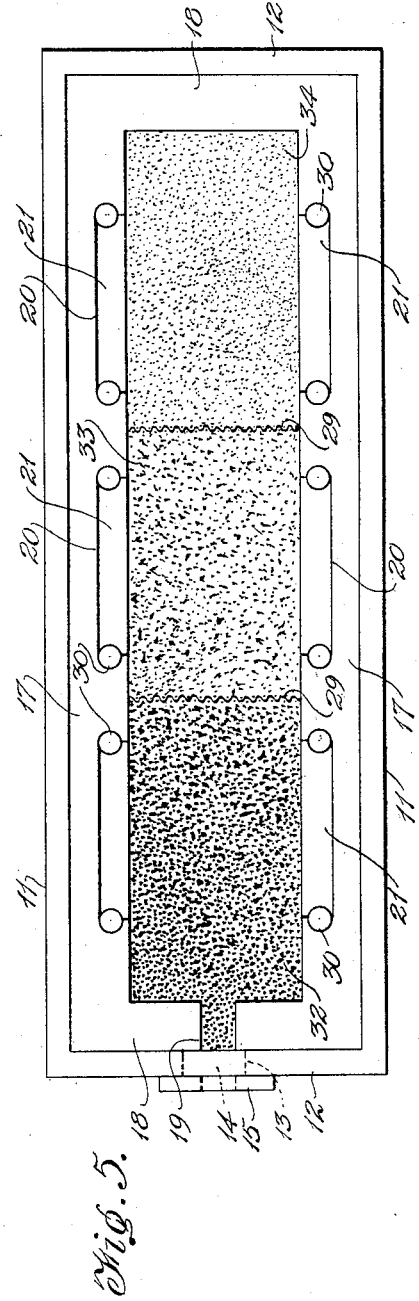
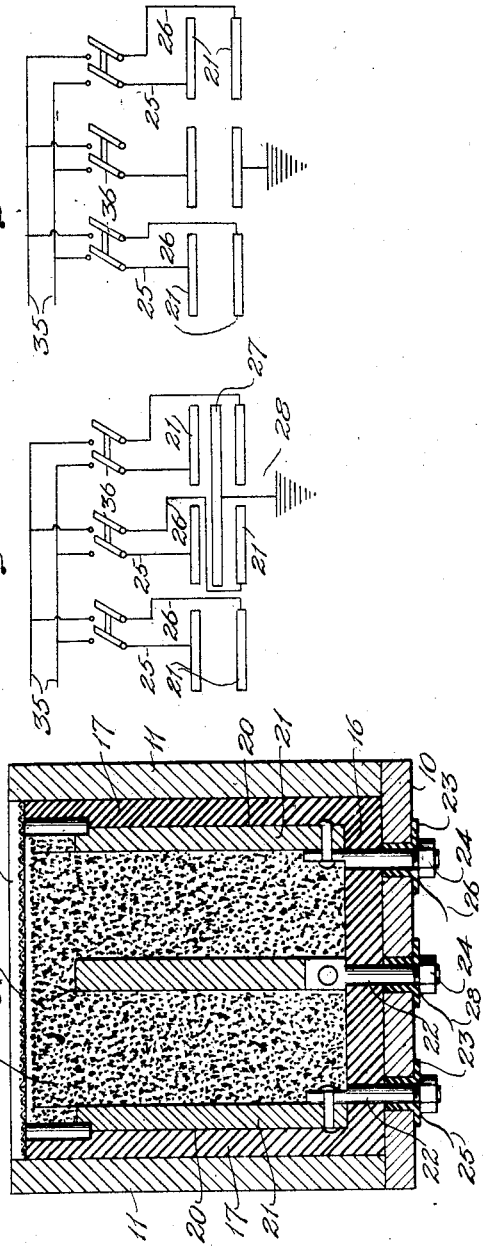
INVENTOR.
Emil Howe,
BY L. N. Gillis
ATTORNEY.

Patented Mar. 13, 1928.

1,662,746

UNITED STATES PATENT OFFICE.

EMIL HOWE, OF SAN GABRIEL, CALIFORNIA.

ELECTRIC SUPERHEATER.

Application filed February 17, 1927. Serial No. 169,100.

This invention relates to electric heaters for liquids, the heater being of the immersion type wherein the liquid to be heated is brought into direct contact with the heater. More especially the invention relates to an electric element for boiling water in boilers for producing steam for steam heating.

One object of the invention is to provide an improved construction for such a heater wherein a series of water heating resistances are employed each having a different heating effect from the others so that water can be boiled more or less rapidly in accordance with the thermal effects to be produced by the boiler, the load on the power lines or transformer, as the case may be, remaining substantially constant.

A second important object of the invention is to provide an improved construction of heater of this class wherein one of the heating resistances consists of powdered charcoal so arranged between terminals that considerable distance may be had between these terminals, preferably of carbon, while there will be but a small amount of water in contact with the particles of the heating element so that steam may be raised very rapidly, in fact almost instantly.

A third important object of the invention is also included in the use of charcoal whereby adjustment of the terminals to accommodate variable conditions in the mineral content of the water, as when using well water in the summer time, is rendered unnecessary and a steady load is maintained on the transformer or other source of current supply.

A fourth important object of the invention is the employment of coffee grounds in a heater of this class as a heating element in one section of the heater so that the current can be switched from the charcoal heating element to the coffee ground heating element, either manually or by means of a thermally or pressure operated switch arrangement, when the need for a heavy heating effect is unnecessary. For instance, with a number of radiators connected with the boiler in which the improved element is installed, the use of the charcoal element may be necessary to keep the steam at the required pressure with all radiators in service while, if the number of radiators in service be cut down, the pressure will be maintained with the lower heating of the water produced by the use of the coffee ground element.

A fifth important object of the invention is to provide, in addition to the charcoal and coffee grounds above mentioned, a heating element of sand so that a low heating effect may be obtained when it is required only to maintain a low supply of heat to the boiler, the sand element being cut in upon the others being cut out.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a section on the line 3—3 of Figure 1.

Figure 5 is a view similar to Figure 1 showing a modified form of the device.

Figure 6 is a wiring diagram for the form shown in Figure 1.

Figure 7 is a view of a wiring diagram for the form shown in Figure 5.

Figure 1:
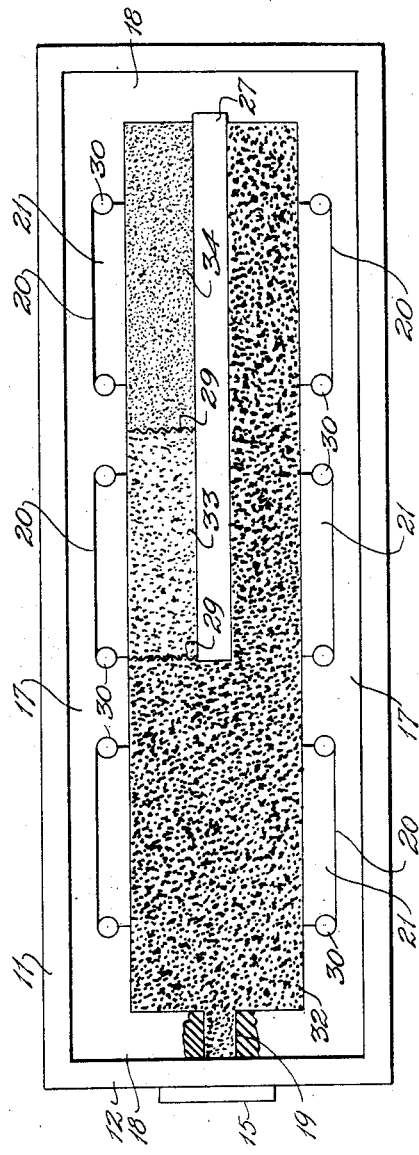
Figure 1 is a plan view of the device with the top screen removed.
Figure 2:
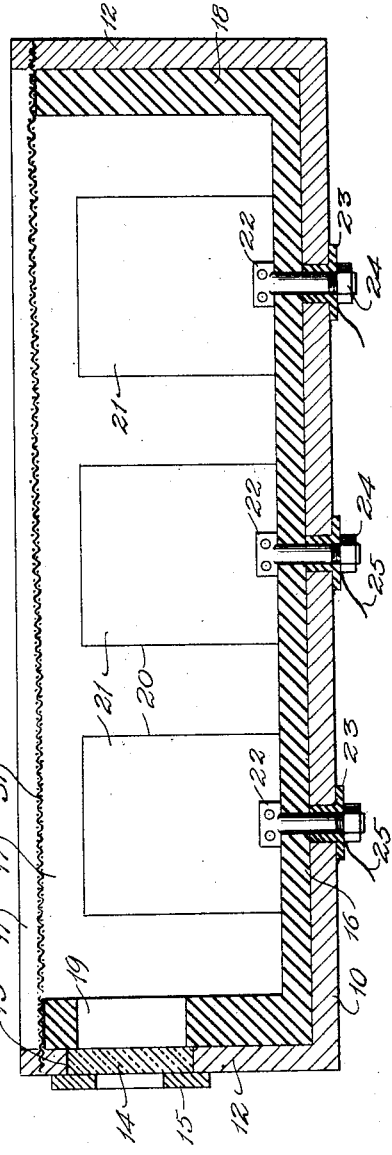
Figure 2 is a section on the line 2—2 of Figure 1.
Figure 4:
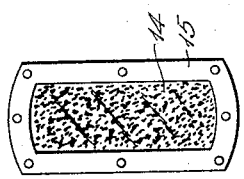
Figure 4 is a face view of the retaining plate for the sight glass used herewith.

In carrying out this invention there is provided an outer casing having a bottom 10, side walls 11 and end walls 12. In one of these end walls is a window 13 wherein is fitted a sight glass 14 held in position by a bezel or flange ring 15. Fitted within the casing is an inner casing of insulating material and having a bottom 16 side walls 17 and end walls 18, one of the latter having a port 19 corresponding to but smaller than the window 13 so that the glass is prevented from moving inwardly. On the inner face of each of the side walls is provided a series of three spaced pockets 20 and in each of these pockets is mounted a terminal or electrode 21 preferably made of a carbon block. Extending downwardly from each of these electrodes is a connection shank 22 which passes through the bottoms 16 and 10, a bushing 23 being provided to prevent contact between the shank 22 and bottom 10. Nuts 24 serve to bind the connecting wires 25 and 26 to these shanks and thus enable connection to be made with a source of electric supply.

It will be noted that the electrodes are arranged in pairs, the two electrodes of each pair being positioned opposite to each other. Between the electrodes of two of these pairs is a further electrode 27 which not only acts as an electrode but also divides the space between the side walls for about two-thirds of the length of the device into two chambers. This electrode 27 is provided with a ground connection 28 similar to the connections of the remaining electrodes. Between the electrode 27 and one of the side walls 17 extends a pair of screens or partitions 29 which serve to divide the space between this electrode and the side wall into two chambers. Wooden plugs 30 serve to hold the side electrodes in position and over the top of these electrodes and the walls 17 and 18 extends a wire mesh screen or top 31. It will now be seen that there is provided a large chamber having one end the full width between the side walls 17 and the other end extending between one of these side walls and the electrode 27. This large chamber is filled with granular carbon in the form of charcoal preferably derived from cocoanut shells. Separated from this charcoal chamber by one of the screens 29 is a second chamber containing coffee grounds 33 and next to this chamber is a chamber containing sand 34. The wires 25 and 26, as shown in the wiring diagrams, connect the electrodes 21 to the supply mains 35 through switches 36 which have here been illustrated as ordinary double pole, single throw switches although I may, if desired use some form of automatic switch controlled either by temperature or pressure conditions. Inasmuch as the particular switch used forms no part of the present invention and since automatic switches of both of these types are well known it is not necessary here to illustrate any automatic switch but the switches 36 are to be taken as typical of any switch which may be found desirable for use.

In the modified form of the invention illustrated in Figure 5 the electrode 27 is omitted and the screens 29 carried from side wall to side wall 17 thus providing the three chambers as before. In this form one of the electrodes 21 is grounded.

In operation the invention is placed in a boiler in an immersed position and the proper wiring connections are made. In starting to heat the water in the boiler current is sent through the carbon or charcoal 32 and since this charcoal lies loosely in its chamber the water will penetrate around the partition and there will be comparatively little water in the chamber so that as the charcoal is heated under the influence of the current steam will be formed almost instantly. It will be observed that the wire screen 31 is positioned slightly above the mass of charcoal so that neither the charcoal nor the other resistance elements are compressed. Upon the pressure in the boiler attaining the desired height unless the drain of steam is very great, the current through the main body of the charcoal is cut off and the current turned on through the coffee grounds and narrow strip of charcoal. This will decrease the heating effect and the water will not boil so rapidly so that excess steam pressure is not generated under usual conditions. If, however, too much steam is still generated then the current may be passed through the sand thus further cutting down the steam generation.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an electric heating device, a casing open at the top, a series of pairs of electrodes supported at opposite sides of the casing, heating resistances of comminuted material contacting with said electrodes and forming paths for current flow between the electrodes of separate pairs, said heating resistances being respectively of powdered charcoal, coffee grounds and sand, and a wire mesh top covering the spaces between said electrodes.

2. In an electric heating device, a casing open at the top, a series of pairs of electrodes supported at opposite sides of the casing, heating resistances of comminuted material contacting with said electrodes and forming paths for current flow between the electrodes of separate pairs, said heating resistances being respectively of powdered charcoal, coffee grounds and sand, a wire mesh top covering the spaces between said electrodes, and a grounded electrode forming a partition between the electrodes of certain pairs.

3. In an electric heating device, a casing open at the top, a series of pairs of electrodes supported at opposite sides of the casing, and heating resistances of comminuted material contacting with said electrodes and forming paths for current flow between the electrodes of separate pairs, said heating resistances being respectively of powdered charcoal, coffee grounds and sand.

4. In an electric heating device, a casing open at the top, a series of pairs of electrodes supported at opposite sides of the casing, heating resistances of comminuted material contacting with said electrodes and forming paths for current flow between the electrodes of separate pairs, said heating resistances being respectively of powdered charcoal, coffee grounds and sand, and a grounded electrode forming a partition between the electrodes of certain pairs.

In testimony whereof I affix my signature.

EMIL HOWE.